April 12, 1966 R. S. JOHNSON ETAL 3,246,317

ANALOG TO INCREMENTAL-DIGITAL CONVERTER

Filed June 13, 1963 2 Sheets-Sheet 1

Robert S. Johnson
Frank R. Williamson, Jr.
Joseph L. Hammond, Jr.,
*INVENTORS.*

BY S. J. Rotondi
A. J. Dupont
Alfred E. Smith

ANALOG TO INCREMENTAL-DIGITAL CONVERTER

Filed June 13, 1963

2 Sheets-Sheet 2

Robert S. Johnson
Frank R. Williamson, Jr.
Joseph L. Hammond, Jr.,
*INVENTORS.*

*BY* S. J. Rotondi
A. T. Dupont
Alfred E. Smith

United States Patent Office 3,246,317

Patented Apr. 12, 1966

3,246,317
ANALOG TO INCREMENTAL-DIGITAL CONVERTER

Robert S. Johnson, Huntsville, Ala., and Frank R. Williamson, Jr., and Joseph L. Hammond, Jr., Atlanta, Ga., assignors, by mesne assignments, to the United States of America as represented by the Secretary of the Air Force Filed June 13, 1963, Ser. No. 290,574
4 Claims. (Cl. 340—347)

This invention relates to devices for converting analog information in the form of voltages into an incremental-digital form, and for converting incremental-digital signals into analog voltages.

Previous methods of analog to incremental-digital data conversion have utilized full-scale analog-to-digital converters which generally require a method of storing the value of the digitalized signal. This storage is necessary in order to use feedback within the converter to insure the high degree of accuracy needed in the conversions. Previous storage techniques have required a digital register or counter capable of storing a value equal to the full scale range of the converter, which increases the complexity and cost of the converter.

It is, therefore, an object of this invention to obviate the need for digital storage devices in analog-to-digital conversion systems.

A further object of this invention is to provide an analog storage device for analog-to-incremental-digital converters.

A still further object is to provide an analog storage device for a digital-to-analog converter.

The analog storage device used in this system consists of an operational amplifier connected with capacitive feedback to form an integrator. The incremental-digital signal is generated as a series of positive and negative pulses of constant area with each pulse representing a change of one increment in the digital value, an alternate digital-output format is a 2-bit parallel binary code in which one bit represents the existence of an incremental change and the other indicates the polarity of the change. To obtain the total value of the incremental-digital signal, the train of pulses must be totaled (summed or integrated). Since the pulses have been made to have a constant area, the above mentioned integrator has the ability to sum the digital information and to store the value as a voltage in the integrator circuit.

Other objects and advantages of the invention and various features of construction and operation thereof will become apparent to those skilled in the art upon reference to the following specification and the accompanying drawings in which.

Figure 1:
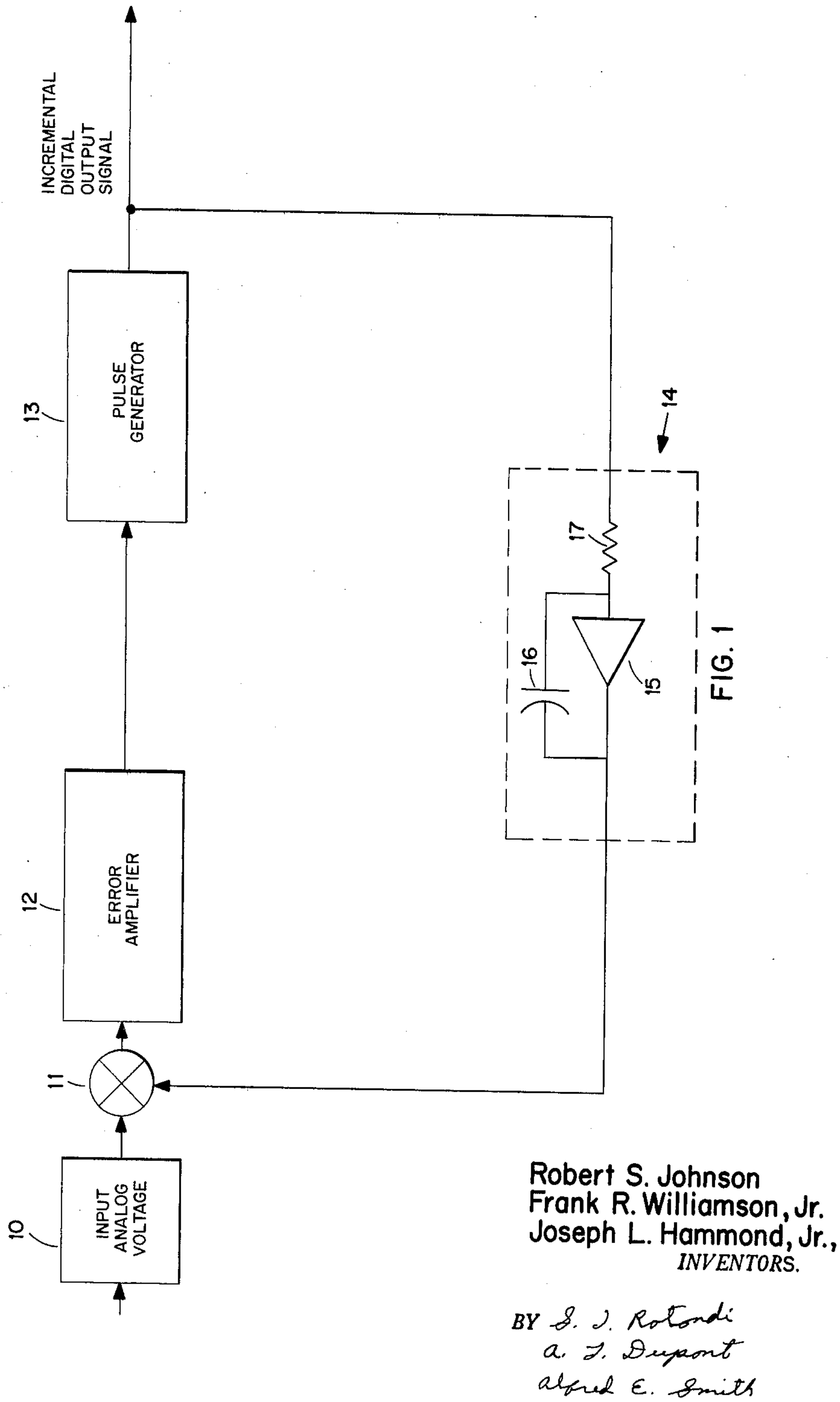
FIGURE 1 is a block diagram of one embodiment of the converter.

The invention described herein utilizes a feedback principle to increase the accuracy of the conversions. It is in this feedback path that the storage of the digitalized signal occurs. A storage device 14 is shown in FIGURE 1 and consists of an operational amplifier 15 connected with a feedback capacitor 16 to form an integrator circuit. The output of this circuit is a voltage that represents the total incremental-digital signal applied at the input of the integrator circuit. This input signal is also the digital output of the analog-to-digital converter. A comparison is made between the output of storage device 14 and an unknown input voltage from source 10 by means of a comparator 11. The difference of these two voltages is amplified by an error amplifier 12, which may include the comparator, and presented at the input of a pulse generator 13. The pulse generator examines this difference to determine if its absolute value is greater than a preset level. This level is set equal to the effect at the output of error amplifier 12 that is produced by one pulse presented at the input of integrator 14. When the amplified difference voltage reaches this preset value the pulse generator presents a pulse at the digital output of the converter. The polarity of this pulse is chosen to reduce the magnitude of the difference voltage. This reduction in difference voltage causes the digital value at the output of the analog-to-digital converter to approach the value of the unknown input voltage due to the negative feedback characteristics of the system. In this manner the digital output of the converter follows the value equal to the unknown input voltage with an error no greater than that represented by one incremental pulse.

Figure 2:
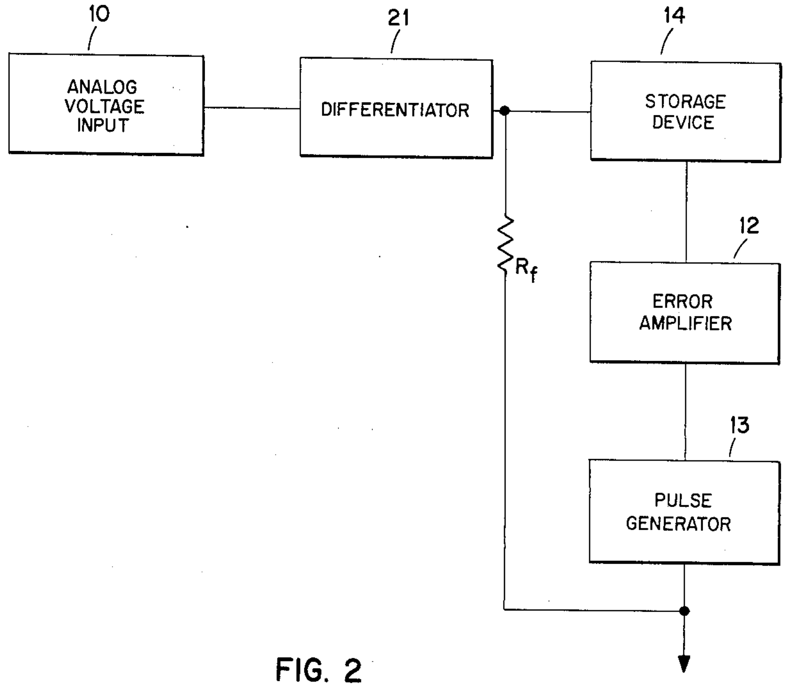
FIGURE 2 is a block diagram of an alternative embodiment of the converter.

An alternate embodiment of the invention, shown in FIGURE 2, introduces the input analog signal through a differentiating network 21 into the integrating storage device 14. The storage device is connected to error amplifier 12 which controls pulse generator 13. Coupling resistor $R_f$ is provided for establishing a feedback path from the pulse generator output to the storage device input. Since the differentiation and integration "cancel" each other with respect to the input signal, and since both operations are linear, then the limit voltage to error amplifier 12 is the same as it would be in the FIGURE 1 embodiment. However, it is clear that the output of the integrator will never rise above a level proportional to the incremental bit size, having reached this level, a resetting pulse is generated which reduces the integrator voltage back to essentially zero.

Figure 3:
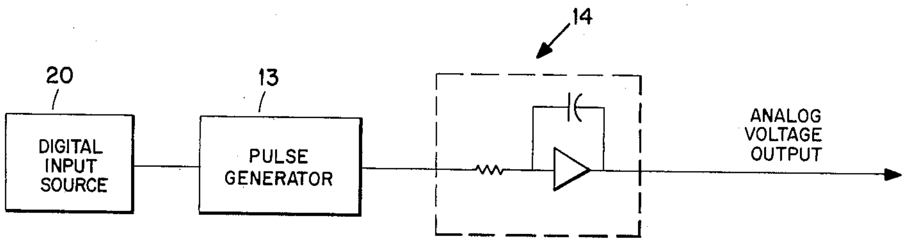
FIGURE 3 is a block diagram of a further modification of the converter.

The analog-to-digital converter may be made to operate in a digital-to-analog mode by connecting storage device 14 to the output of pulse generator 13, as illustrated in FIGURE 3, and applying a digital signal to the input of the pulse generator. Since there is no output pulse from generator 13 unless the input voltage to this section is above a preset level, an incremental-digital signal in the proper form may be applied at this point and this signal will be reproduced at the input of storage device 14 in the form of constant area pulses. The storage device will then convert this information into an analog voltage. In this mode of operation, a voltage equal to the incremental-digital signal presented at the input of the pulse generator is produced at the output of the storage device.

While the invention has been described with reference to preferred embodiments thereof, it will be apparent that various modifications will occur to those skilled in the art within the scope of the invention as set forth in the appended claims.

We claim:

1. A system for converting analog voltages to incremental-digital signals comprising in combination:
   (a) an analog voltage input source;
   (b) a comparator connected to the output of said voltage input source;
   (c) an error amplifier responsive to a signal substantially equal to the difference between said input signal and a signal representing the analog equivalent of said incremental-digital output of said system being connected to the output of said comparator;
   (d) a pulse generator connected to said error amplifier for producing said incremental-digital signals; and
   (e) an integrator circuit for generating and storing said analog equivalent signal having an input connected to the output of said pulse generator and an output connected to said comparator, whereby an analog signal applied to said comparator results in a pulse representing one increment of change to the input of said comparator being generated by said pulse generator and stored in an analog form in said integrator circuit for comparison with said analog input signal until the digital value at the output of the system approaches the value of the analog input signal.

2. A system for converting analog voltages to incremental-digital signals, said system comprising in combination:

(a) an analog input signal source;
(b) a differentiating network coupling said input signal to an integrating circuit having resistive coupling means;
(c) an error amplifier connected to the output of said integrating circuit; and
(d) a pulse generator for producing an incremental-digital signal connected to said error amplifier and said resistive coupling means.

3. A system for converting a digital signal to an analog voltage comprising in combination:

(a) a digital signal source;
(b) a pulse generator connected to said digital signal source for producing constant area pulses; and (c) a storage device connected to the output of said pulse generator for producing an anlog voltage proportional to said constant area pulses.

4. A system as set forth in claim 3, wherein said storage device comprises an operational amplifier connected with capacitive feedback to form an integrator.

References Cited by the Examiner

UNITED STATES PATENTS

| | | | |
|---|---|---|---|
| 2,796,314 | 6/1957 | Bishop et al. | 340—347 |
| 2,801,281 | 7/1957 | Oliver et al. | 340—347 |
| 2,870,436 | 1/1959 | Kuder | 340—347 |
| 2,941,196 | 6/1960 | Raynsford et al. | 340—347 |
| 2,956,271 | 10/1960 | Keller | 340—347 |
| 2,969,535 | 1/1961 | Foulkes | 340—347 |
| 3,074,642 | 1/1963 | Sanders | 340—347 |
| 3,141,157 | 7/1964 | Raffo | 340—347 |

DARYL W. COOK, *Acting Primary Examiner.*

MALCOLM A. MORRISON, *Examiner.*

K. R. STEVENS, *Assistant Examiner.*